United States Patent Office 3,054,771
Patented Sept. 18, 1962

3,054,771
STABILIZING POLYVINYL CHLORIDE WITH TERPENES AND ORGANOMETALLIC CARBOXYLIC ACID SALTS
Harry Eugene Hiestand, Lawrence, Kans., and James Maurice Quinn, Tonawanda, N.Y., assignors to E. I. du Pont de Nemours and Company, Wilmington, Del., a corporation of Delaware
No Drawing. Filed Aug. 12, 1959, Ser. No. 833,153
17 Claims. (Cl. 260—23)

This invention relates to the manufacture of shaped articles of polymeric halogenated hydrocarbons. More specifically, it relates to the stabilization of the polymeric halogenated hydrocarbons, particularly above their melting temperatures, for successful shaping into articles.

This application is a continuation-in-part of our copending application Serial No. 754,941, filed August 14, 1958, now abandoned.

The invention will be described as it applies to polyvinyl chloride or copolymers of vinyl chloride having vinyl chloride as the major constituent, and their formation into films for use in packaging applications and the like. However, the invention is equally applicable to polymers and copolymers of vinyl fluoride and may be extended to include all polymeric materials whose thermal decomposition is at least partially attributed to the loss of halogen acid from the composition, thereby leading to discoloration; and the shaping of these polymeric materials into films, filaments, fibers, foils, coatings, etc. Besides polyvinyl chloride and polyvinyl fluoride, the invention applies to such polymeric materials as vinylidene chloride polymers, vinylidene chloride-vinyl chloride copolymers, vinylidene chloride-acrylonitrile copolymers, vinylidene fluoride polymers and copolymers, after-chlorinated polyvinyl chloride, chloroprene polymers, chlorosulfonated polyethylene, and the like.

Polyvinyl chloride is characterized by poor thermal stability, particularly at temperatures above its melting point. Thermal decomposition is evidenced by a browning of the normally white polymer. As degradation continues the polymer becomes progressively darker until charring and substantial degradation occur. This lack of thermal stability presents a serious obstacle to the commercial exploitation of the polymer since the preferred methods of forming shaped structures involve the use of heat.

The object of the present invention is a substantially stabilized polymer that can be formed into shaped structures at elevated temperatures, e.g., by melt or plasticized extrusion, rolling, coalescence or solvent casting, without encountering the aforementioned difficulties. A further object is a polyvinyl chloride composition that can easily be melt-extruded into a useful film. Other objects will appear hereinafter.

The objects are accomplished by a composition of matter comprising the halogenated hydrocarbon polymer; at least one compound selected from the group consisting of olefinically unsaturated terpenes and oxygen, hydrocarbon and halogen derivatives of olefinically unsaturated terpenes; and at least one compound selected from the group consisting of organometallic compounds of tin and metals of Group II of the Periodic Table.[1] The preferred halogenated hydrocarbon polymers are those in which the halogen has an atomic weight of 19–36.

Olefinically unsaturated terpenes are meant to include the naturally-occurring and synthetically-prepared olefinically unsaturated terpenes and terpene mixtures. These have the general formula $(C_5H_8)_x$ wherein $x$ may have a value from 2 through 6 and may be open or straight chain, monocyclic, bicyclic, tricyclic or polycyclic. The preferred terpene compounds are olefinically unsaturated bicyclic terpenes and oxygen, hydrocarbon and halogenated derivatives of olefinically unsaturated bicyclic terpenes, wherein one ring of the bicyclic terpene contains no more than 4 carbon atoms. Even more preferred are those terpene compounds fulfilling the above requirements and, in addition, wherein the second ring carries at least one unsaturated hydrocarbon radical selected from the group consisting of exo-methylene and exo-alkenyl, said radical attached only to a single carbon atom of the ring.

The amount of terpene or terpene derivatives used, particularly for the melt-extrusion of polyvinyl chloride films, should be enough to provide adequate thermal stability during the forming operation but not enough to affect the properties of the resulting film adversely. Concentrations of at least 1% of the terpene or terpene derivative, based on the weight of the terpene or terpene derivative plus polymer, have been found most useful. The maximum used will depend on the process of forming the shaped structures. However, the maximum concentration of terpene or terpene derivative remaining in the ultimate product is preferably no greater than 15%. This means that for melt-extrusion or dispersion-coalescence processes, 1–15% may be used in the starting mixture. In solvent casting, where the terpene or terpene derivative is evaporated during formation of the shaped structure, a much higher concentration may be used in the starting composition.

As stated previously, the present invention contemplates the use, in combination with the specific group of organometallic compounds, of the naturally-occurring olefinically unsaturated terpenes, terpene fractions, generally isolated by fractional distillation, and synthetically prepared olefinically unsaturated terpenes and terpene derivatives to improve the thermal stability and lower the melt viscosity of polyvinyl chloride. Olefinically unsaturated terpenes imparting the greatest thermal stability are characterized, as mentioned before, by the presence of an exo double bond,

i.e., a double bond not contained in a closed ring structure. Beta-caryophyllene, beta-pinene, pinocarveol (a terpene alcohol), and nopadiene (a terpene hydrocarbon), the outstanding compounds for use in the present invention, in addition to having the exo double bond, are bicyclic, with one four membered ring and fulfill all of the most preferred requirements. The first three of these are further distinguished by having the exo double bond attached directly to the larger ring structure of the compound. The distinguishing characteristics common to these compounds will be clearly apparent from their structural formula:

Beta-caryophyllene

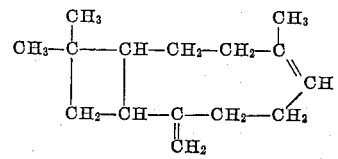

[1] Periodic Table means Mendeleeff's Periodic Table of the Elements, Handbook of Chemistry and Physics, 25th ed., published by the Chemical Rubber Publishing Co.

Beta-pinene

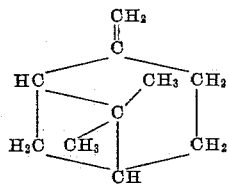

Pinocarveol

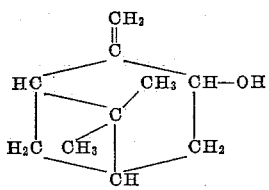

Nopadiene

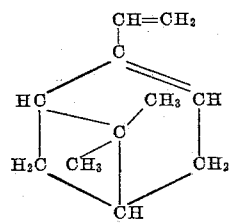

The shorthand formulae for beta-caryophyllene, beta-pinene, pinocarveol and nopadiene are:

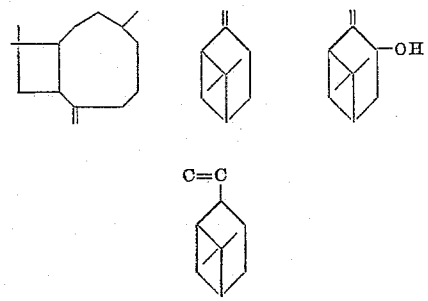

and respectively. Other useful compounds include: d-limonene, dipentene (d,l-limonene), myrcene, alpha-pinene, geraniol, camphene, menthene, d,l-nerolidol, terpineol, alpha-fenchene, alloocimene, linalool, carvone, pinocarvyl chloride, citronellol, citral and citronella.

The organometallic compounds contain tin and metals selected from Group II of the Periodic Table, preferably magnesium, calcium, strontium, barium, zinc, cadmium and tin. The metal are joined to one or more organic radicals in said organometallic compounds and optionally may also be joined to one or more inorganic groupings such as oxide, hydroxide, or halide. The metals are generally joined to the organic radicals by means of linkages to carbon, sulfur, or oxygen atoms. The organic radicals joined to the metals may either be saturated or unsaturated and may contain one or more functional groupings such as ester, ether, thioether, thioester, epoxy, hydroxy, amine, amide, phosphate ester, and the like. Useful classes of organometallic compounds include heavy metal soaps or salts (such as those of tin and zinc) and alkaline earth metal soaps or salts (such as those of calcium, strontium, barium and magnesium), dialkyl metal derivatives, particularly dialkyl tin derivatives such as the dibutyl and dioctyl derivatives and thio-organometallic compounds such as thioesters and mercaptides. These may be in a monomeric state or, where applicable, in a polymeric state if desired. Most of these organometallic compounds tend to exhibit at least a slight stabilizing ability for halogenated hydrocarbon polymers when used singly, but in no case to a degree comparable to that obtained when used in the preferred amounts with the terpene compounds necessary in the compositions of this invention.

Useful organometallic compounds of the classes described above include organometallic carboxylic acid salts, organometallic thioesters and organometallic mercaptides particularly where the organo portion of the compounds is a dialkyl group, each alkyl radical of the group having 1–8 carbon atoms. Specific useful compounds include dibutyl tin mercaptide, dibutyl tin maleate (optionally as low polymer), dibutyl tin dilaurate, tin stearate, dioctyl tin bis-monobutylmaleate, calcium acetate, calcium glyceryl phosphate, calcium oleate, magnesium glycerophosphate, magnesium stearate, zinc stearate, zinc laurate, zinc 2-ethyl hexoate, cadmium naphthenate, cadmium ricinoleate, cadmium stearate, cadmium 2-ethyl hexoate, calcium stearate, calcium ricinoleate, calcium ethyl acetoacetate, strontium stearate, strontium ricinoleate, strontium naphthenate, barium stearate, barium ricinoleate, barium laurate and barium 2-ethyl hexoate. The most preferred organometallic compounds are selected from the group consisting of organotin carboxylic acid salts, organotin thioesters and organotin mercaptides, particularly the dialkyl tin carboxylic acid salts, the dialkyl tin thioesters and the dialkyl tin mercaptides, each alkyl radical bearing from 1 to 8 carbon atoms.

The amounts of organometallic compounds to be used in combination with the terpenes must be sufficient to suppress the tendency to color formation during the forming operation, preferably in amounts small enough so as not to affect the properties of the resulting film adversely or to impart toxicity and a disagreeable odor to the shaped structure. Concentrations of at least 0.01% of the organometallic compounds, based on the total weight of the composition, have been found most useful. Addition of from 0.1% to 1.0% has been shown to be generally adequate when used with the preferred amounts of terpenes, and addition of still higher percentages usually has little further stabilizing effect. In general, the maximum concentration of organometallic compound remaining in the ultimate product should not exceed about 5%, in order to prevent any significant change in the desired properties of the product, such as its clarity and its mechanical and electrical properties.

The suprisingly high degree of thermal stabilization obtained in the compositions of this invention permits forming the compositions into shaped structures at elevated temperatures continuously for long periods of time without encountering objectionable decomposition or discoloration. The compositions thus are uniquely suitable for commercially advantageous high speed, high temperature forming operations such as melt extrusion.

The particular advantages of the synergistic combinations of the terpenes and the organometallic compounds over the use of either class of compounds alone follow. The preferred combinations provide an extraordinarily high degree of stabilization, and have entirely eliminated color formation during even very extended extrusion operations involving polyvinyl chloride and similar halogenated hydrocarbon polymers. Since non-toxic organometallic additives, such as calcium, magnesium and zinc salts can be used successfully with the terpenes, the non-toxicity of the terpenes is preserved. This is highly desirable in a composition used to prepare food packaging films. Moreover, even slightly toxic organometallic compounds may be used in sufficiently small amounts as to render the resulting compositions substantially non-toxic. As compared with the use of organometallic compounds alone, a considerably lower melt viscosity is obtained. The extrusion temperature can thereby be lowered 5–25° C., tending by itself to improve the polymer stability. As mentioned above, if degradation begins due to transient over-heating, this may readily be overcome and clear film re-obtained merely by lowering the extrusion temperature, without necessitating shutting down the equipment. This aspect of reversibility is very important in a continuous process. The preferred synergistic combinations are markedly superior to the use of the organometallic compounds alone in preventing skin formation. Any such inner layer of polymer tends to flush out during the course of the extrusion, rather than build up within the extruder to cause ultimate difficulty.

The process for forming shaped structures involves blending a mixture of the halogenated hydrocarbon polymer, a compound selected from the group consisting of olefinically unsaturated terpenes and derivatives of olefinically unsaturated terpenes, and a compound selected from the group consisting of organometallic compounds of alkaline earth metals and tin; then heating the mixture until it is converted into a homogeneous single phase composition; and, thereafter, forming the homogeneous single phase into a shaped structure and cooling the structure.

Specific embodiments falling within the definition of the process and composition of the invention will be apparent from the following examples. It is understood that the examples should not be considered to limit the scope of the present invention. In the examples, all parts are by weight unless otherwise specified.

EXAMPLES I–III

In Example I, a mixture consisting of 90 parts by weight of a polyvinyl chloride resin (the resin having an inherent viscosity of 1.21 deciliters per gram measured at 0.25% concentration in hexamethyl phosphoramide at 30° C.), 8 parts of beta-pinene, 1 part "Thermolite" 31 [2] and 2 parts of "Tenox" BHT [3] was prepared by ball milling the ingredients together for 60 minutes. A one-gram sample of this mixture was pressed for 5 minutes between ferrotype plates under a total force of 30 tons in a Carver laboratory press heated to 210° C. The resulting film was clear and entirely colorless when viewed against a source of white light.

For Example II, a mixture similar to that used in Example I but containing only 0.5 part "Thermolite" 31 was prepared. A one-gram sample of this mixture was pressed for 5 minutes at 210° C. The resulting film was clear and entirely colorless.

For Example III, a mixture similar to that used in Example I but containing only 0.2 part "Thermolite" 31 was prepared. A one-gram sample of this mixture pressed for 5 minutes at 210° C. gave a clear film having a very faint yellow coloration.

Three controls were also prepared. Control A consisted of 90 parts of the polyvinyl chloride resin, 12 parts of "Tenox" BHT and 2 parts of "Lubricin" V-3 [4]. Control B consisted of 90 parts of the polyvinyl chloride resin, 10 parts of beta-pinene, 2 parts of "Tenox" BHT and 2 parts of "Lubricin" V-3. Control C consisted of 98 parts of the polyvinyl chloride resin, 0.5 part of "Thermolite" 31 and 2 parts of "Tenox" BHT.

A one-gram sample of the Control A mixture, when pressed between ferrotype plates under a total force of 30 tons at 210° C. for only 4 minutes, was converted to a brownish-black, charred, nearly opaque film containing numerous black particles. A one-gram sample of the Control B mixture, when pressed similarly for 5 minutes, provided a clear film which had a yellow cast when viewed against a source of white light. A one-gram sample of the Control C mixture, when similarly pressed for 5 minutes, resulted in a brown film containing numerous bubbles.

The results of Examples I–III and the appropriate controls are summarized in Table 1.

Table 1

MELT PRESSING OF POLYVINYL CHLORIDE RESIN SHOWING SYNERGISM BETWEEN BETA-PINENE AND "THERMOLITE" 31

| Example | Additive | | Melt Press Test |
|---|---|---|---|
| | Beta-Pinene (parts) | "Thermolite" 31 (parts) | |
| I | 8 | 1 | Clear—Colorless. |
| II | 8 | 0.5 | Do. |
| III | 8 | 0.2 | Clear—Faintly yellow. |
| Control A | 0 | 0 | Opaque—Brownish-black. |
| Control B | 10 | 0 | Clear—Yellow. |
| Control C | 0 | 0.5 | Bubbles—Brown. |

EXAMPLES IV–VIII

In Example IV, a mixture consisting of 90 parts of polyvinyl chloride resin (inherent viscosity of 1.21), 8 parts beta-pinene, 0.5 part "Thermolite" 31 and 2 parts of "Lubricin" V-3 was prepared. The mixture was melted and extruded at a temperature of 195° C. through a conventional one-inch diameter extruder using a six-inch wide flat die at a throughput rate of 12 pounds per hour. Extrusion was continued over a period of 3 hours. The film produced throughout the run was glass-transparent, completely colorless, substantially free of particles or imperfections of any kind and had excellent surface quality.

For Examples V and VI, 7 parts and 5 parts of beta-pinene were used, respectively. In all other respects, the composition of the mixtures and the procedure was identical to Example IV. In both examples extrusion produced an essentially colorless film over periods in excess of 3 hours.

For Examples VII and VIII, the identical composition of Example IV was used except that a polyvinyl chloride resin having an inherent viscosity of 1.04 was substituted in Example VII and a polyvinyl chloride resin having an inherent viscosity of 1.57 was substituted in Example VIII. Melt extrusion of both these mixtures resulted in a clear, colorless film.

As Control A, a mixture of 98 parts of polyvinyl chloride resin (inherent viscosity of 1.21) and 2 parts of "Lubricin" V-3 was fed into the extruder heated to a temperature of 205° C. The mixture was converted to a bubbly black mass partially through the heated zone of the extruder and could not be extruded due to plugging of the equipment. Similar results were obtained in other attempted experiments using this same mixture at temperatures ranging from 185°–230° C. Below 185° C. the polyvinyl chloride resin did not coalesce.

As Control B, a mixture consisting of 96 parts of the polyvinyl chloride resin, 2 parts of "Lubricin" V-3 and 1 part of "Thermolite" 31 was used. The mixture was melted and extruded at a temperature of 205° C. It was necessary to resort to this higher temperature (higher than in the examples) since the melt viscosity of the mixture containing only "Thermolite" 31 was higher. It was possible to extrude the film for only a short time before encountering serious degradation. Even the initially produced film was somewhat degraded, displaying a yellowish-brown cast which was particularly noticeable near the edges of the film. During extrusion it was noted that highly degraded black particles appeared in portions of the film. The film also took on a hazy, melt fractured appearance soon after the start of extrusion. After completion of the run, it was found that severe degradation of the polymer had occurred within the extruder. Similar results were obtained when 2 parts of "Thermolite" 31 were used. The use of 3.5 parts "Thermolite" 31 in a mixture with 94.5 parts of the polyvinyl

---

[2] A liquid dibutyl tin thioester formulation having a density of 1.11 manufactured by the Metal & Thermit Corp.
[3] A butylated hydroxytoluene manufactured by the Tennessee Eastman Co.
[4] A modified castor oil consisting principally of glyceryl triricinoleate manufactured by the Baker Castor Oil Co.

chloride resin and 2 parts of "Lubricin" V-3, when extruded at a temperature of 210° C., produced a film that was initially clear and essentially colorless with a few black particles embedded in the film. However, after two hours of operation, the film suddenly took on a markedly hazy, melt fractured appearance. When the extruder was opened, it was found that the inner surface of the die and the hopper lips were coated with degraded polymer.

As Control C, the mixture of 90 parts of the polyvinyl chloride resin, 8 parts of beta-pinene and 2 parts of "Lubricin" V-3 was used. Extrusion was accomplished at a temperature of 195° C. over a period of 3 hours. During the first few minutes of extrusion the film produced was clear and essentially colorless. However, as extrusion proceeded, the film took on a yellowish cast. At the end of the extrusion period it was found that slight degradation of the polymer had occurred within the extruder.

The results of Examples VI-VIII and the appropriate controls are summarized in Table 2.

*Table 2*

EXTRUSION EXPERIMENTS OF POLYVINYL CHLORIDE (PVC) RESIN SHOWING SYNERGISM BETWEEN BETA-PINENE AND "THERMOLITE" 31

| Example | Inherent Viscosity of PVC | Additive | | Extrusion Test |
|---|---|---|---|---|
| | | Beta-Pinene (parts) | "Thermolite" 31 (parts) | |
| IV | 1.21 | 8 | 0.5 | Clear—Colorless. |
| V | 1.21 | 7 | 0.5 | Do. |
| VI | 1.21 | 5 | 0.5 | Do. |
| VII | 1.04 | 8 | 0.5 | Do. |
| VIII | 1.57 | 8 | 0.5 | Do. |
| Control A | 1.21 | 0 | 0 | Bubbles—Black and could not be extruded. |
| Control B | 1.21 | 0 | 1-3.5 | Yellow-brown edges, degraded, black particles. |
| Control C | 1.21 | 8 | 0 | Clear—Yellow. |

EXAMPLE IX

A mixture consisting of 94 parts of polyvinyl chloride resin (inherent viscosity of 1.21), 4 parts of beta-caryophyllene, 0.5 part "Thermolite" 31 and 2 parts of "Lubricin" V-3 was prepared. The mixture was melt extruded at a temperature of 210° C. using the equipment described in Example IV. The extrusion continued successfully over a period of 2 hours to produce a film that was clear and essentially colorless throughout the extrusion.

For Controls A and B, the results of extrusion are those shown in the preceding examples as summarized in Table 2.

For Control C, a mixture of 92 parts of the polyvinyl chloride resin, 6 parts beta-caryophyllene and 2 parts of "Lubricin" V-3 was prepared. The mixture was melt extruded at a temperature of 205° C. At the start of the extrusion run the film was essentially colorless. After about 10 minutes, although the film remained clear, a yellow cast was apparent in the film. At the end of a 5-hour period, the extruder was opened and degraded polymer was found therein.

EXAMPLE X

A mixture of 90 parts of polyvinyl chloride resin (inherent viscosity of 1.21), 8 parts camphene, 0.5 part "Thermolite" 31 and 2 parts of "Lubricin" V-3 was prepared. The mixture was melt extruded at a temperature of 205° C. through the extruder described in Example IV. The film produced was clear and remained colorless throughout the extrusion period of 20 minutes.

For Controls A and B, the results of extrusion are those shown in the preceding examples as summarized in Table 2.

For Control C, 90 parts of the polyvinyl chloride resin, 8 parts camphene and 2 parts "Lubricin" V-3 were mixed. The mixture was melt extruded at a temperature of 205° C. The film produced, although clear and well coalesced, had a brown cast after extrusion had proceeded for only 10 minutes.

EXAMPLE XI

A mixture of 90 parts of polyvinyl chloride resin (inherent viscosity of 1.21), 8 parts of beta-pinene, 0.5 part "Ferro-768"[5] and 2 parts of "Lubricin" V-3 was prepared. A one-gram sample of this mixture was pressed for 6 minutes between ferrotype plates under a total force of 30 tons at a temperature of 210° C. The resulting film was clear and colorless with very faint purple and yellow streaks.

As a control, 94 parts of the polyvinyl chloride resin mixed with 6 parts of "Ferro-768" was pressed for 4 minutes at 210° C. The resulting film was tan.

Another control containing 90 parts of the polyvinyl chloride resin mixed with 8 parts of beta-pinene and 2 parts of "Lubricin" V-3 was pressed for 6 minutes at 210° C. The resulting film was clear and had a yellow-brown cast.

EXAMPLE VII

A mixture of 90 parts of polyvinyl chloride resin (inherent viscosity of 1.21), 8 parts beta-pinene, 0.5 of "Ferro-768" and 2 parts of "Lubricin" V-3 was prepared. The mixture was melt extruded at a temperature of 185° C. using the equipment described in Example IV. The film produced was clear and colorless throughout the extrusion period. After extrusion it was noted that there was relatively little degraded polymer inside the extruder.

As one control, a mixture of 87 parts of the polyvinyl chloride resin, 10 parts of "Ferro-768" and 3 parts of "Lubricin" V-3 was prepared. The film produced by melt extrusion at 210° C. was yellow and contained black particles after only a few minutes operation. Upon opening the extruder, a deposit of highly degraded polymer was found. The other controls are similar to those disclosed in Examples IV-VIII and summarized in Table 2.

EXAMPLE XIII

A mixture of 90.5 parts polyvinyl chloride resin (inherent viscosity of 1.21), 7 parts of beta-caryophyllene, 0.5 part of "Thermolite" 31 and 2 parts of "Lubricin" V-3 was prepared. This mixture was extruded at a temperature of 200° C. through an extruder equipped with a 2-inch circular die, the die being maintained at a temperature of 200° C., into an air quench zone maintained at a temperature of 20° C. The resulting tubing was thereafter collapsed and wound on a roll. The extrusion operation was continued over a period of 14 hours. Throughout this period the film tubing remained sparkling clear and completely colorless. At the end of the period, very little degraded polymer was found within the extruder and die.

As one control, a mixture consisting of 93.5 parts of the polyvinyl chloride resin, 3.5 parts "Thermolite" 31 and 3 parts of "Lubricin" V-3 was prepared. This mixture was extruded through the described equipment at a temperature of 210° C. Although the film produced initially was clear and essentially colorless, the appearance of embedded particles in the extruded film was observed. After a 2-hour period, the film took on a markedly hazy, melt fractured appearance. When the extruder was opened, it was found that the inner surface of the extruder and die were coated with the degraded polymer.

As a second control, a mixture consisting of 92 parts of the polyvinyl chloride resin, 6 parts of beta-caryophyllene and 2 parts of "Lubricin" V-3 was prepared. The mixture was melt extruded at a temperature of 200° C.

---
[5] A composition consisting of mixed calcium, magnesium and zinc organometallic salts, produced by the Ferro Chemical Corporation.

using the above equipment. The film, essentially colorless at the start of the run, developed a yellow cast after about 20 minutes.

EXAMPLES XIV–XXIX

A series of melt pressing tests were run using the procedure described in Example I with mixtures consisting of 90 parts of polyvinyl chloride resin (inherent viscosity of 1.21), 8 parts of beta-pinene, 2 parts of "Lubricin" V–3 and 0.5 part of various specified organometallic compounds. In each case one-gram samples of the mixture were pressed at 210° C. for 6 minutes. The resulting films were substantially colorless, and each case showed a distinct improvement over results obtained using either beta-pinene or the organometallic compound singly in this concentration range. The organometallic compounds tested in combination with beta-pinene are given in Table 3.

Table 3

| Example | Organometallic Compound Used |
| --- | --- |
| XIV | Calcium ricinoleate. |
| XV | Dioctyl tin bis-monobutylmaleate. |
| XVI | Calcium acetate. |
| XVII | "Thermolite" 12—A product of the Metal & Thermit Corp., consisting of dibutyl tin dilaurate. |
| XVIII | "Thermolite" 13—A product of the Metal & Thermit Corp., consisting of dibutyl tin maleate. |
| XIX | "Thermolite" 20—A liquid dibutyl tin thioester formulation having density 0.995, produced by the Metal & Thermit Corp. |
| XX | "Thermolite" 25—An organotin formulation produced by the Metal & Thermit Corp. |
| XXI | "Advastab" 17M—An alkyl tin thioester formulation having density 1.12, produced by the Advance Solvents & Chemical Corp. |
| XXII | "Advastab" BC-12—An organometallic formulation containing barium and cadmium laurate, produced by the Advance Solvents & Chemical Corp. |
| XXIII | "Advastab" 23-30—An organometallic formulation containing barium and cadmium compounds produced by the Advance Solvents & Chemical Corp. |
| XXIV | "Advastab" C-77—An organocadmium formulation produced by the Advance Solvents & Chemical Corp. |
| XXV | "Advastab" 143—An organocadmium formulation produced by the Advance Solvents & Chemical Corp. |
| XXVI | "Advastab" 89-X—An organocadium formulation produced by the Advance Solvents & Chemical Corp. |
| XXVII | Harshaw 2-V-4—An organometallic formulation containing cadmium alkyl-aryl phosphite, produced by the Harshaw Chemical Co. |
| XXVIII | Harshaw 59-V-10—A product of the Harshaw Chemical Co., consisting of organometallic calcium and zinc compounds. |
| XXIX | "Ferro-760"—A mixture of calcium, magnesium and zinc organometallic salts, produced by the Ferro Chemical Co. |

The compositions of this invention are useful in the preparation of shaped structures of all types. They are extremely useful in preparing films, filaments, fibers, foils and the like, and as coatings for wood, metals, etc. However, their greatest ability is in the formation of self-supporting films for packaging applications. These films may be fabricated into sheets, envelopes or tubes and used to package foodstuffs, hardware items, machine parts, etc., or they may be coated with adhesives or magnetic compositions to improve their sealability or to be used as industrial or sound recording tapes, etc.

The invention contemplates the use of a compound selected from olefinically unsaturated terpenes and their oxygen, hydrocarbon or halogenated derivatives together with a compound selected from the group consisting of organometallic compounds of alkaline earth metals and tin as the essential additives to the polymeric compositions. The olefinically unsaturated terpenes or their derivatives may be used singly or in mixtures of the terpenes and/or their derivatives as the terpene component. The organometallic compounds likewise may be used singly or in mixtures as the organometallic component. The present invention also contemplates the use of other ingredients along with the essential additives provided such ingredients do not detract from the function of the essential additives. Thus, the addition of pigments, dyes, delusterants, primary or secondary plasticizers, latent solvents, fillers, lubricants, photostabilizers, etc., in amounts suitable for improving processing or for desired end use characteristics is understood to be within the purview of this invention.

What is claimed is:

1. A composition of matter comprising polyvinyl chloride, at least 1% of a terpene selected from the group consisting of beta-pinene, beta-caryophyllene and camphene and at least 0.01% of an organometallic compound selected from the group consisting of organometallic carboxylic acid salts of tin and metals of Group II of the Periodic Table and of carboxylic acids having from 2 to 18 carbon atoms.

2. A composition of matter as in claim 1 wherein said organometallic compound is calcium acetate.

3. A composition of matter as in claim 1 wherein said organometallic compound is calcium ricinoleate.

4. A composition of matter as in claim 1 wherein said organometallic compound is cadmium laurate.

5. A composition of matter as in claim 1 wherein said organometallic compound is barium laurate.

6. A composition of matter as in claim 1 wherein said organometallic compound is dioctyl tin bis-monobutylmaleate.

7. A composition of matter as in claim 1 wherein said organometallic compound is dibutyl tin dilaurate.

8. A composition of matter as in claim 1 wherein said organometallic compound is dibutyl tin maleate.

9. A composition of matter as in claim 1 wherein said terpene is beta-pinene.

10. A composition of matter as in claim 1 wherein said terpene is beta-caryophyllene.

11. A shaped structure comprising polyvinyl chloride, 1–15% by weight of a terpene selected from the group consisting of beta-pinene, beta-caryophyllene and camphene and 0.01–5% by weight of an organometallic compound selected from the group consisting of organometallic carboxylic acid salts of tin and metals of Group II of the Periodic Table and of carboxylic acids having from 2 to 18 carbon atoms.

12. A self-supporting film comprising polyvinyl chloride, 1–15% by weight of a terpene selected from the group consisting of beta-pinene, beta-caryophyllene and camphene and 0.01–5% by weight of an organometallic compound selected from the group consisting of organometallic carboxylic acid salts of tin and metals of Group II of the Periodic Table and of carboxylic acids having from 2 to 18 carbon atoms.

13. A process for forming shaped structures which comprises blending a mixture of polyvinyl chloride, at least 1% of a terpene selected from the group consisting of beta-pinene, beta-caryophyllene and camphene and at least 0.01% of an organometallic compound selected from the group consisting of organometallic carboxylic acid salts of tin and metals of Group II of the Periodic Table and of carboxylic acids having from 2 to 18 carbon atoms; heating said mixture to convert the mixture into a homogeneous single phase composition; forming said composition into a shaped structure and cooling said structure.

14. A process for forming a self-supporting film which comprises blending a mixture of polyvinyl chloride, 1–15% by weight of a terpene selected from the group consisting of beta-pinene, beta-caryophyllene and camphene and 0.01–5% by weight of an organometallic compound selected from the group consisting of organometallic carboxylic acid salts of tin and metals of Group II of the Periodic Table and of carboxylic acids having from 2 to 18 carbon atoms; heating said mixture to convert the mixture into a homogeneous single phase composition; extruding said composition in the form of a film and cooling said film.

15. A process as in claim 14 wherein said terpene is beta-pinene.

16. A process as in claim 14 wherein said terpene is beta-caryophyllene.

17. A process as in claim 14 wherein said organo-metallic compound is cadmium laurate.

References Cited in the file of this patent

UNITED STATES PATENTS

| | | |
|---|---|---|
| 2,310,971 | Lincoln et al. | Feb. 16, 1943 |
| 2,407,405 | Dietrich et al. | Sept. 19, 1946 |
| 2,711,401 | Lally | June 21, 1955 |
| 2,801,258 | Johnson | July 30, 1957 |